United States Patent
Mass et al.

(10) Patent No.: US 11,853,296 B2
(45) Date of Patent: Dec. 26, 2023

(54) CLARIFICATION QUESTIONS SELECTION FOR CONVERSATIONAL SEARCH, TRAINED FROM HUMAN-TO-HUMAN CONVERSATIONS AND SOLUTION DOCUMENTS

(71) Applicant: International Business Machines Corporation, Armonk, NY (US)

(72) Inventors: Yosi Mass, Ramat Gan (IL); Doron Cohen, Gilon (IL); David Konopnicki, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 17/386,572

(22) Filed: Jul. 28, 2021

(65) Prior Publication Data

US 2023/0029829 A1  Feb. 2, 2023

(51) Int. Cl.
G06F 16/242 (2019.01)
G06N 3/08 (2023.01)

(52) U.S. Cl.
CPC .............. G06F 16/243 (2019.01); G06N 3/08 (2013.01)

(58) Field of Classification Search
CPC .................................. G06F 16/243; G06N 3/08
See application file for complete search history.

(56) References Cited

U.S. PATENT DOCUMENTS

| | | | |
|---|---|---|---|
| 9,805,718 B2 | 10/2017 | Ayan | |
| 10,586,155 B2 | 3/2020 | Cook | |
| 2016/0342895 A1* | 11/2016 | Gao | G06F 40/56 |
| 2017/0193240 A1* | 7/2017 | Baker | G06F 21/604 |
| 2020/0012673 A1 | 1/2020 | Rudzicz | |
| 2020/0012721 A1 | 1/2020 | Pasupalak | |
| 2020/0184959 A1* | 6/2020 | Yasa | G10L 15/1815 |

(Continued)

OTHER PUBLICATIONS

Aliannejadi M. et al, "Asking Clarifying Questions in Open-Domain Information-Seeking Conversations"; SIGIR '19, Jul. 21-25, 2019.

(Continued)

*Primary Examiner* — Richard L Bowen
*Assistant Examiner* — Aryan D Toughiry
(74) *Attorney, Agent, or Firm* — Dvir Gassner (57) ABSTRACT

Clarification-question selection, including: Receiving a search conversation that includes utterances by a user and by a conversational search system. Retrieving, from a solution documents database, text passages that are relevant to the search conversation. Retrieving, from a clarification questions database, for each of the text passages, candidate clarification questions that are relevant to both the respective text passage and the search conversation. Ranking the candidate clarification questions according to (a) a first deep learning model that outputs, for each of the candidate clarification questions, a score denoting a strength of association between the respective candidate clarification question and the search conversation, and/or (b) a second deep learning model that outputs, for each of the candidate clarification questions, a score denoting a strength of association between the respective candidate clarification question, the search conversation, and the text passage that was retrieved for the respective candidate clarification question.

19 Claims, 3 Drawing Sheets

(56) References Cited

U.S. PATENT DOCUMENTS

2021/0168110 A1* 6/2021 Marmar ................. G06F 40/30
2021/0241050 A1* 8/2021 Gunaratna ............. G06N 3/042

OTHER PUBLICATIONS

Aliannejadi M. et al, "Generating clarifying questions for open-309 domain dialogue systems (clariQ)"; Online at: https://arxiv.org/abs/2009.11352, Sep. 25, 2020.

Antonios Minas Krasakis et al, "Analysing the effect of clarifying questions on document ranking in conversational search"; Proceedings of the 2020 ACM SIGIR on International Conference on Theory of Information Retrieval. Online at: https://dl.acm.org/doi/10.1145/3409256.3409817; Sep. 14, 2020.

Devlin J. et al, "BERT: Pre-training of deep bidirectional transformers for language understanding"; In Proceedings of the 2019 Conference of the North American Chapter of the Association for Computational Linguistics: Human Language Technologies, vol. 1 (Long and Short Papers), pp. 4171-4186, Association for Computational Linguistics, Jun. 2-7, 2019.

Ganhotra J. et al, "Conversational document prediction to assist customer care agents"; In Proceedings of the 2020 Conference on Empirical Methods in Natural Language Processing, EMNLP 2020, Online, Nov. 16-20, 2020, pp. 349-356. Association for Computational Linguistics.

Hamed Zamani et al, "Generating clarifying questions for information retrieval"; In Proceedings of The Web Conference 2020, WWW '20, p. 418-428, New York, NY, USA. Association for Computing Machinery, Apr. 2020.

Hoffer E. et al., "Deep metric learning using triplet network"; In 3rd International Conference on Learning Representations, ICLR 2015, San Diego, CA, USA, May 7-9, 2015, Workshop Track Proceedings.

Paik et al., "A Fixed-Point Method for Weighting Terms in Verbose Informational Queries," Proceedings of the 23rd ACM International Conference on Conference on Information and Knowledge Management, (CIKM '14), Nov. 3-4, 2014, pp. 131-140.

Rao S. et al, "Learning to Ask Good Questions: Ranking Clarification Questions using Neural Expected Value of Perfect Information"; Proceedings of the 56th Annual Meeting of the Association for Computational Linguistics (Long Papers), pp. 2737-2746, Jul. 15-20, 2018.

Shengli Wu, "Data Fusion in Information Retrieval"; vol. 13. Jan. 2012, Springer-Verlag, Berlin.

Stephen Robertson et al, "Theprobabilistic relevance framework: Bm25 and beyond"; Found. Trends Inf. Retr., vol. 3 No. 4, pp. 333-389, Dec. 17, 2009.

Wenjie Ou et al, "A Clarifying Question Selection System from NTES_ALONG in Convai3 Challenge"; Online at: https://arxiv.org/abs/2010.14202, Oct. 27, 2020.

Yinhan Liu et a;,"Roberta: A robustly optimized BERT pretraining approach"; Online at: https://arxiv.org/abs/1907.11692, Jul. 26, 2019.

Yosi Mass et al, "A study of bert for non-factoid question-answering under passage length constraints"; Online at: https://arxiv.org/abs/1908.06780, Aug. 19, 2019.

Zhang Y. et al, "Towards Conversational Search and Recommendation: System Ask, User Respond"; CIKM'18, Oct. 22-26, 2018.

* cited by examiner

CLARIFICATION QUESTIONS SELECTION FOR CONVERSATIONAL SEARCH, TRAINED FROM HUMAN-TO-HUMAN CONVERSATIONS AND SOLUTION DOCUMENTS

BACKGROUND

The invention relates to the field of computerized conversational search.

A key task in computer-era information and knowledge discovery is the retrieval of relevant information given a user's information need. With the growing abundance and diversity of available textual knowledge sources, it has become increasingly difficult for users, even ones experienced in searching, to obtain relevant information from these sources. Many users will not be satisfied by the first response of a search engine to their query, and will need to perform several rounds with the search engine in order to distill relevant information. In many cases, the lack of proper mechanisms for processing complex information searching tasks leads to unsuccessful results.

To accomplish such complex information searching tasks, a new paradigm of search has emerged—conversational search. Conversational search goes beyond the traditional ad-hoc (also "one-shot") retrieval paradigm, by guiding the user through the information distillation process: the user issues an initial query, the conversational search system presents a clarification question (sometimes along with an interim answer), the user answers the clarification question, and this process of clarification questions and answers continues until the system is able to provide, based on the accumulating answers, a satisfactory resolution of the user's problem or information need. The process is also sometimes referred to as "mixed initiative" conversational search, because initiative is taken both by the user and by the system.

Today's conversational search paradigm is roughly divided into two approaches: one involves automatic selection of clarification questions from a pool of pre-determined questions, and the other entails automatic generation of clarification questions using machine learning or rule-based mechanisms.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment relates to a computer-implemented method comprising the following automated steps: receiving a search conversation that comprises utterances by a user and by a conversational search system; retrieving, from a solution documents database, text passages that are relevant to the search conversation; retrieving, from a clarification questions database, for each of the text passages, candidate clarification questions that are relevant to both the respective text passage and the search conversation; ranking the candidate clarification questions according to at least one of: (a) a first deep learning model that outputs, for each of the candidate clarification questions, a score denoting a strength of association between the respective candidate clarification question and the search conversation, and (b) a second deep learning model that outputs, for each of the candidate clarification questions, a score denoting a strength of association between the respective candidate clarification question, the search conversation, and the text passage that was retrieved for the respective candidate clarification question; and based on said ranking, providing a highest-ranking candidate clarification question for presentation to the user.

Another embodiment relates to a system comprising: at least one hardware processor, and a non-transitory computer-readable storage medium having program code embodied therewith, the program code executable by said at least one hardware processor to, automatically: receive a search conversation that comprises utterances by a user and by a conversational search system; retrieve, from a solution documents database, text passages that are relevant to the search conversation; retrieve, from a clarification questions database, for each of the text passages, candidate clarification questions that are relevant to both the respective text passage and the search conversation; rank the candidate clarification questions according to at least one of: (a) a first deep learning model that outputs, for each of the candidate clarification questions, a score denoting a strength of association between the respective candidate clarification question and the search conversation, and (b) a second deep learning model that outputs, for each of the candidate clarification questions, a score denoting a strength of association between the respective candidate clarification question, the search conversation, and the text passage that was retrieved for the respective candidate clarification question; and based on said ranking, provide a highest-ranking candidate clarification question for presentation to the user.

A further embodiment relates to a computer program product comprising a non-transitory computer-readable storage medium having program code embodied therewith, the program code executable by at least one hardware processor to: receive a search conversation that comprises utterances by a user and by a conversational search system; retrieve, from a solution documents database, text passages that are relevant to the search conversation; retrieve, from a clarification questions database, for each of the text passages, candidate clarification questions that are relevant to both the respective text passage and the search conversation; rank the candidate clarification questions according to at least one of: (a) a first deep learning model that outputs, for each of the candidate clarification questions, a score denoting a strength of association between the respective candidate clarification question and the search conversation, and (b) a second deep learning model that outputs, for each of the candidate clarification questions, a score denoting a strength of association between the respective candidate clarification question, the search conversation, and the text passage that was retrieved for the respective candidate clarification question; and based on said ranking, provide a highest-ranking candidate clarification question for presentation to the user.

In some embodiments, said ranking is according to a fusion of the scores output by the first and second deep learning models.

In some embodiments, said retrieving of the text passages comprises: retrieving, from the solution documents database, solution documents that are relevant to the search conversation, by querying the solution documents database with a query created from words in the search conversation, wherein said querying comprises utterance-biased weighting of the words; extracting candidate text passages from the retrieved solution documents using a fixed-size, partly-overlapping, sliding window; assigning an initial score to each of the candidate text passages, based on coverage of words in the search conversation by the respective candidate text passage; and calculating a final score for each of the candidate text passages, based on a combination of the respective initial score with a relevancy score that was assigned, in said retrieving from the solution documents database, to the solution document from which the respective candidate text passage was extracted; wherein said retrieving of the text passages is of a predefined number of those of the candidate text passages having a highest final score.

In some embodiments, said retrieving of the candidate clarification questions comprises: for each of the text passages, querying the clarification questions database with a concatenation of the respective text passage and the search conversation, to retrieve candidate clarification questions for that respective text passage.

In some embodiments, the method further comprises, or the program code further executable to, prior to any other step: provide a training set that comprises: (i) conversations that each took place between a human user and a human agent, wherein a last utterance in each of the conversations is a labeled clarification question asked by the human agent, and (ii) for each of the conversations, a negative example which is a randomly-selected clarification question from the clarification questions database, wherein the randomly-selected clarification question is not the labeled clarification question of the respective conversation; and train the first deep learning model based on the training set.

In some embodiments, the method further comprises, or the program code further executable to, prior to any other step: provide a training set that comprises: (i) conversations that each took place between a human user and a human agent, wherein each of the conversations comprises: a labeled clarification question asked by the human agent, and a labeled answer given by the human user, (ii) training text passages that are retrieved, from solution documents associated with the conversations, based on their relevancy to the conversations, and (iii) for each of the conversations, a negative example which is a randomly-selected clarification question from the clarification questions database, wherein the randomly-selected clarification question is not the labeled clarification question of the respective conversation; and train the second deep learning model based on the training set.

In some embodiments, the automated steps of the method are performed by at least one hardware processor.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein is a computer-implemented method, also embodied in a system and a computer program product, for automatic selection of a clarification question from a pool of clarification questions during a conversational search session.

Given a search conversation that includes utterances by a user and by a conversational search system, one or two advantageous deep learning models may be used to rank candidate clarification questions according to how suitable they are to ask at the present point in time in the conversational search session. The highest-ranking clarification question (or, optionally, multiple highest-ranking clarification questions) may then be presented to the user by the conversational search system.

The first of these models may be one that is trained to output, for each candidate clarification question, a score denoting a strength of association between that respective candidate clarification question and the search conversation.

The second of these models may be one that is trained to output, for each candidate clarification question, a score denoting a strength of association between the respective candidate clarification question, the search conversation, and a text passage that was retrieved for that candidate clarification question from a solution document.

Although each of these models may be used individually, in its own embodiment, to rank the candidate clarification questions, a combined embodiment may include a fusion of the scores provided by both models in order to rank the candidate clarification questions. Experimental results (provided below) point at the advantage, at least in some scenarios, of using that fusion of scores from the two models.

Retrieval of the candidate clarification questions is discussed in further discussed below, and so is the manner of training the two deep learning models.

Figure 1:
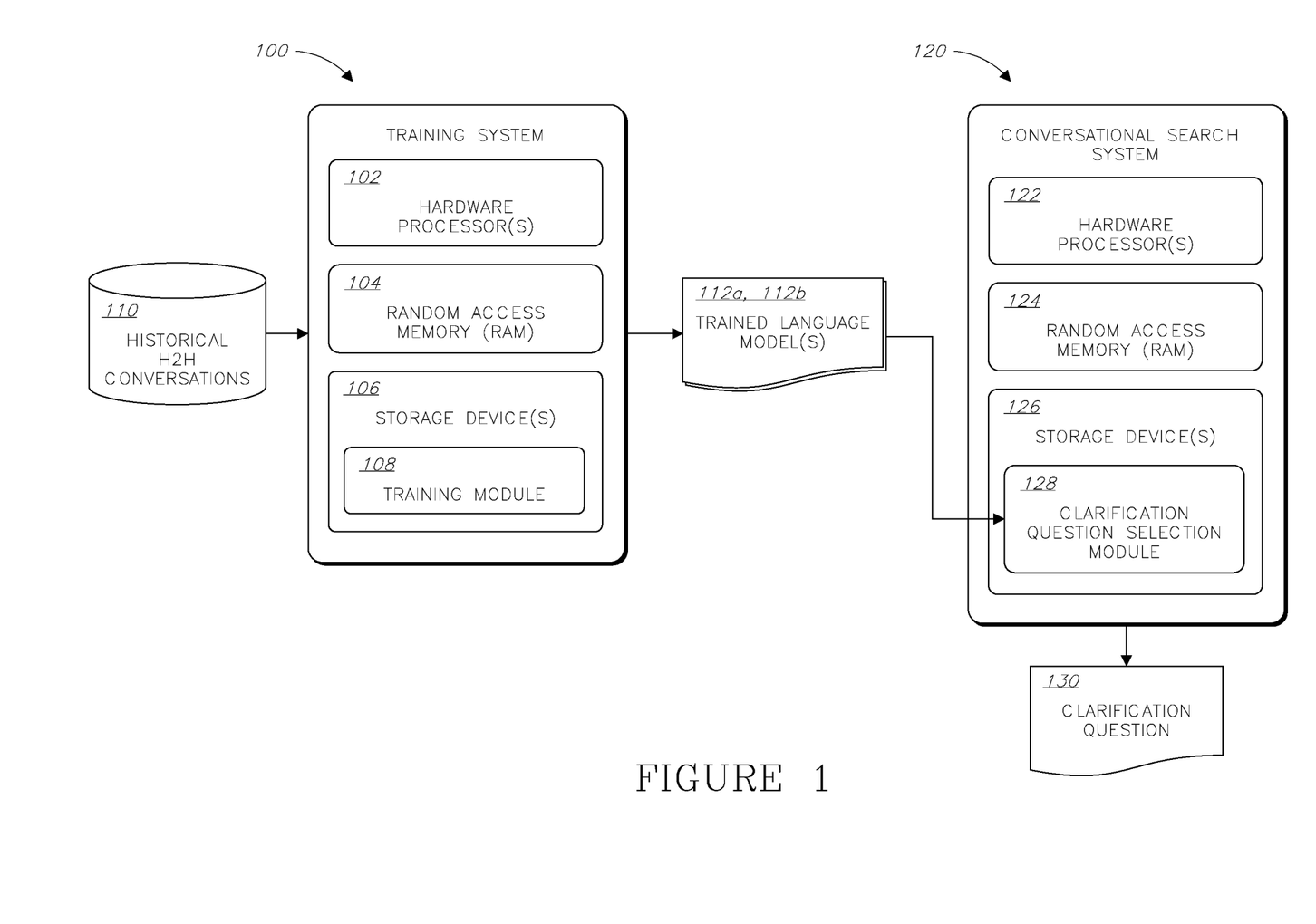
FIG. 1 is a block diagram of an exemplary configuration for training one or two deep learning models to rank clarification questions, and for selecting a suitable clarification question during operation of a conversational search system, according to an embodiment.

Reference is now made to FIG. 1, which shows a block diagram of an exemplary configuration for training one or two deep learning models (hereinafter "models" for short) to rank clarification questions, and for selecting a suitable clarification question during operation of a conversational search system. Accordingly, the illustrated configuration includes a training system 100 for training the language model, a conversational search system 120, and clarification-question selection module 128 which is either included in system 120 as shown, or is disposed externally to system 120 but maintained in functional association with it, such as via network connection; for example, clarification-question selection module 128 may be included in a server (not shown) that is configured to receive requests for clarification questions from conversational search system 120 via a network connection in real time, during conversation of system 120 with a user, and return one or more suitable clarification questions via the network connection.

Training system 100 may include one or more hardware processor(s) 102, a random-access memory (RAM) 104, and one or more non-transitory computer-readable storage device(s) 106.

Storage device(s) 106 may have stored thereon program instructions and/or components configured to operate hardware processor(s) 102. The program instructions may include one or more software modules, such as a training module 108. The software components may include an operating system having various software components and/or drivers for controlling and managing general system tasks (e.g., memory management, storage device control, power management, etc.), and facilitating communication between various hardware and software components.

Training system 100 may operate by loading instructions of training module 108 into RAM 104 as they are being executed by processor(s) 102. The instructions of training module 108 may cause training system 100 to, inter alia, access a database of historical human-to-human ("H2H") conversations 110, train one or two models, and output one or two trained models 112*a-b* that are configured to rank clarification questions. This training is discussed in greater detail with reference to FIG. 2, below.

Training system 100, as described herein, is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. System 100 may include any additional component enabling it to function as an operable computer system, such as a motherboard, data busses, power supply, a network interface card, a display, an input device (e.g., keyboard, pointing device, touch-sensitive display), etc. (not shown). Moreover, components of system 100 may be co-located or distributed, or the system may be configured to run as one or more cloud computing "instances," "containers," "virtual machines," or other types of encapsulated software applications, as known in the art.

Conversational search system 120 is optionally a conventional conversational search system which is configured to orchestrate the back-and-forth rounds with the user in a manner known in the art and therefore not discussed here in detail. Advantageously, that conventional system is associated, according to present embodiments, with a clarification-question selection module 128 which selects a suitable clarification question in real time, every time system 120 determines that a clarification question is needed to clarify one or more user utterances during a conversational search session (such as the user's initial query, and/or any subsequent utterance(s)). Clarification-question selection module 128 may utilize trained models 112*a-b* to rank such clarification questions and enable a subsequent selection of a suitable clarification question, as discussed below in greater detail with reference to FIG. 3.

Except for clarification-question selection module 128, conversational search system 120 may include, similar to training system 100, one or more hardware processor(s) 122, a random-access memory (RAM) 124, and one or more non-transitory computer-readable storage device(s) 126, as well as one or more of the other types of components described above in connection with training system 100.

Conversational search system 120 may operate by loading instructions of clarification-question selection module 128, and instructions of any other modules providing its conventional conversational search functionality (not shown) into RAM 124 as they are being executed by processor(s) 122.

Figure 2:
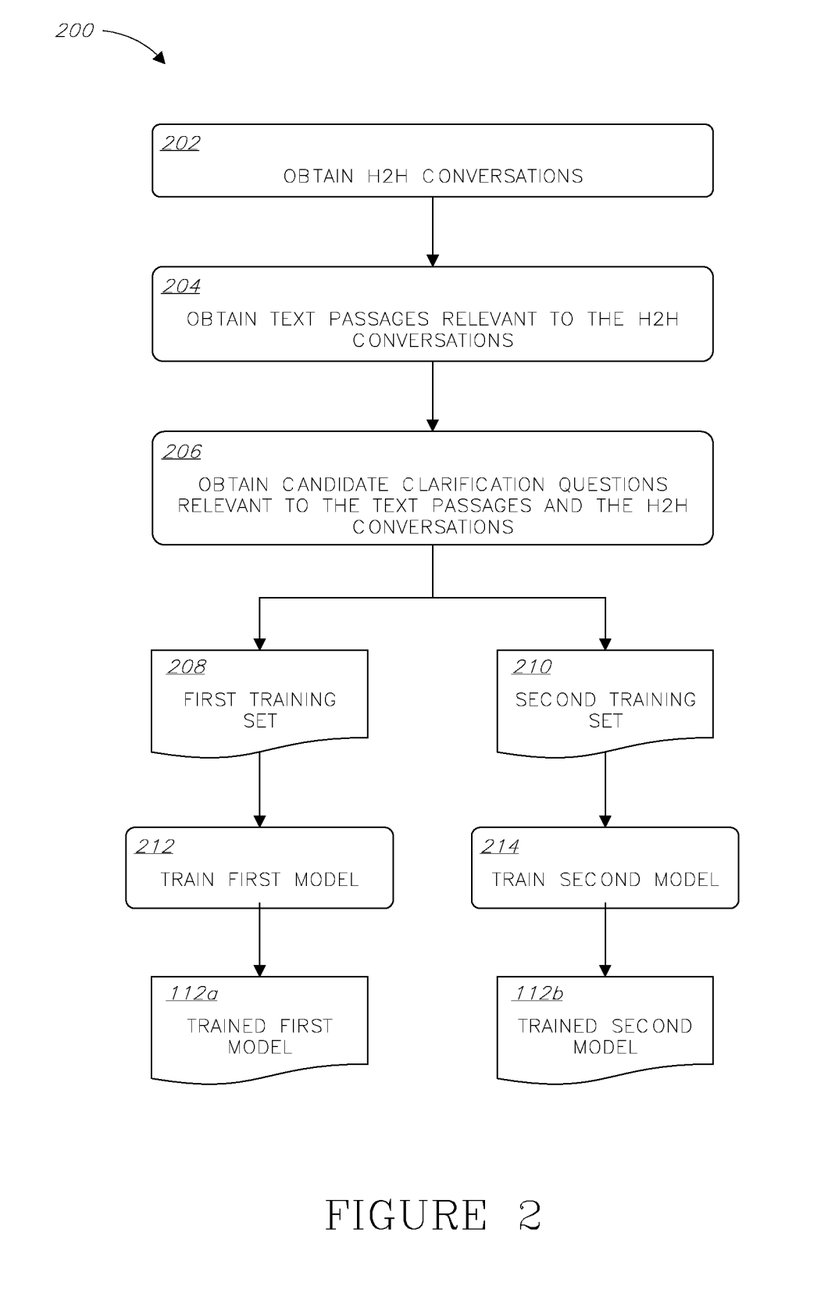
FIG. 2 is a flowchart of a method for training one or two models for ranking of clarification questions, according to an embodiment.

The instructions of training module 108 of training system 100 are now discussed with reference to the flowchart of FIG. 2, which illustrates a method 200 for training one or two models for ranking of clarification questions, in accordance with an embodiment. The figure first illustrates a few steps that are executed irrespective of whether one or both models are to be trained, followed by steps unique to the training of each of the two models.

Figure 3:
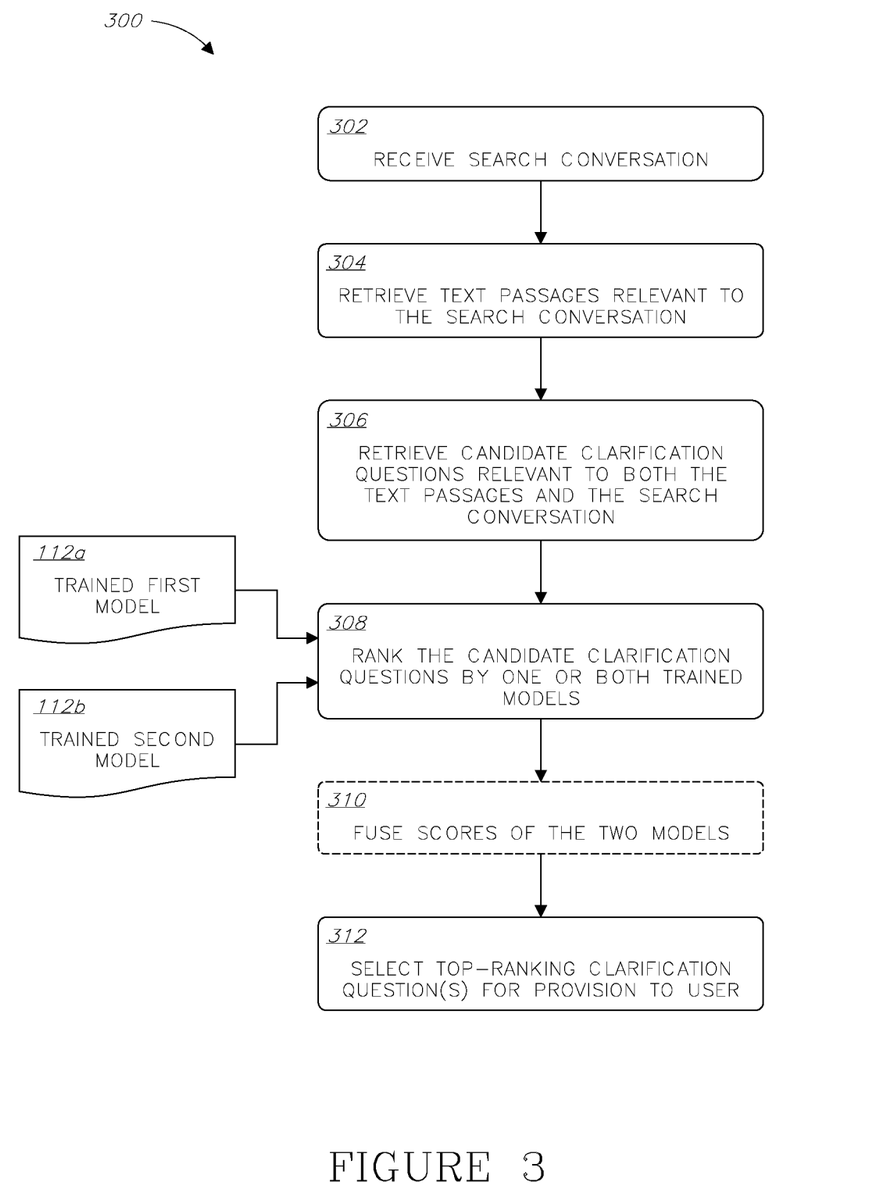
FIG. 3 is a flowchart of a method for selecting a suitable clarification question during a search conversation, according to an embodiment.

In the following description of method 200 (and subsequently, of method 300), certain notations are used: Each H2H conversation used for training, or a search conversation conducted between a user and a conversational search system, may be formally regarded as a list of utterances, $C=\{c_0, \ldots, c_n\}$, where $c_0$ is the initial user query, $c_j$ ($j \leq n$) is a clarification question, and $c_k$ ($k \leq n$) is an answer to that clarification question ($k>j$; and, in many cases, $k=j+1$). A clarification-question selection task may be defined as follows: Given a conversation $C^{j-1}=\{c_0, \ldots, c_{j-1}\}$, predict a clarification question ($c_j$) at the next utterance of the conversation. The clarification question, naturally, appears only in the H2H conversations used in training (along with its answer, $c_k$), and is the prediction target at inference, namely—when, given a search conversation being conducted between a user and a conversational search system, a suitable clarification question needs to be selected for presentation to the user (typically, following an utterance by the user).

In a step 202, H2H conversations (namely, conversations that each took place between a human user and a human agent) may be obtained, for example from a database storing historical H2H conversations (denoted 110 in FIG. 1) previously conducted between users (e.g., customers of an organization) and agents (e.g., customer support representatives of the organization).

Each such H2H conversation typically includes multiple utterances (also "messages," "turns," or "rounds") exchanged between the user and the agent, often starting with an initial query by the user, continuing with a series of clarification questions asked by the agent and answered by the user, and ending with the agent providing a resolution to the user's problem, commonly in the form of a hyperlink to a relevant solution document (stored in a solution documents database). Naturally, however, since the dialog is between humans, it may slightly deviate from that structure, given the conversational styles of the humans involved. In addition, not all of these types of utterances are required for training each of the two models, as will be discussed below. Finally, the parties to the conversation need not necessarily have a customer-supplier relationship; these could be any two persons engaged in a conversation in which one person (termed "agent" for convenience) assists the other (termed "user" for convenience) with a problem.

The H2H conversations may be obtained in text form, whether they have been conducted originally in writing or have been transcribed (e.g., using a speech-to-text engine) from voice calls.

The clarification question(s) in each H2H conversation as well as the answer(s) to these questions may be labeled as such, to enable certain aspects of the training, as will be discussed further below. The labeling may be pre-provided (such as by human annotators) or determined automatically using a rule-based algorithm, a machine learning classifier, and/or the like.

In a step 204, text passages that are relevant to each of the H2H conversations may be obtained from solution documents stored in the solution documents database. For each H2H conversation, text passages are obtained from the solution document(s) that is/are associated with (namely, linked from or referred by) the respective conversation. This is because that solution document is likely a good source of relevant texts, per the decision of the human agent to select that document as the solution to the user's problem.

The manner of obtaining the relevant text passages may differ based on whether there is a single solution document associated with a certain H2H conversation, or multiple solution documents associated with it.

If there are multiple associated solution documents, there may be a preliminary step of scoring these documents based on their relevancy to the H2H conversation, as follows: A conventional search engine (using an "inverted index" or "index" for short) may be queried using a disjunctive query created from all words in $C^k$. Following Ganhotra et al., "Conversational Document Prediction to Assist Customer Care Agents," Proceedings of the 2020 Conference on Empirical Methods in Natural Language Processing (EMNLP 2020), Nov. 16-20, 2020, pages 349-356, $C^k$ may be treated as a verbose query, and the Fixed-Point (FP) method (Paik et al., "A Fixed-Point Method for Weighting Terms in Verbose Informational Queries," Proceedings of the 23$^{rd}$ ACM International Conference on Conference on Information and Knowledge Management, (CIKM '14), Nov. 3-4, 2014, pages 131-140) may be applied for weighting its words. Yet, compared to many typical verbose queries, dialogs (such as H2H conversations and search conversations) are further segmented into distinct utterances. Using this observation, an utterance-biased extension for enhanced word-weighting may be implemented. To this end, the various utterances in $C^k$ may be first scored based on the initial FP weights of words they contain. Then, utterance scores may be propagated back to their associated words.

Then, whether there is a single solution documents or multiple (now scored) solution documents, text passage retrieval may be performed for a given H2H conversation ($C^k$) by first extracting candidate text passages from the solution document(s) associated with that H2H conversation using a partly-overlapping, fixed-size, sliding window.

Following the extraction of the candidate text passages, each extracted (retrieved) text passage p may be assigned a score based on the coverage of words in $C^k$ by p. Coverage may be defined as the sum over all words in each utterance, using words' global IDF (Inverse Document Frequency) and their (scaled) TF (Term Frequency). In case there are multiple solution documents associated with $C^k$, that score may be combined (e.g., using linear combination, or any other type of combination) with the relevancy score of the solution document it is extracted from.

Finally, top-r text passages may be selected, for each H2H conversation, as the output of step 204, namely—a predefined number (r, an integer) of text passages having the highest scores. r may be, for example, a value between 1-50, such as in a range between 1-10, 5-10, 1-20, 5-20, 1-30, 10-30, 1-40, 20-40, and so on and so forth.

In a step 206, for each of the top-r text passages selected in the previous step, candidate clarification questions, that are relevant to both the respective text passage and the H2H conversation for which that text passage what retrieved, may be retrieved from a pool of clarification questions, stored in a clarification questions database.

This may be performed, for each text passage p, by concatenating the text of all utterances in $C^k$ to the content of p, and using these joint texts as a query to the clarification questions database (which may be operated by a conventional search engine). Step 206 thus results in a list of candidate clarification questions for each of the text passages. This list may be shortened, to include only the top-s candidate clarification questions, namely—a predefined number (s, an integer) of candidate clarification questions having the highest relevancy scores, as provided by the search engine. s may be, for example, a value between 1-50, such as in a range between 1-10, 5-10, 1-20, 5-20, 1-30, 10-30, 1-40, 20-40, and so on and so forth.

Steps 202 through 206 provide, essentially, training sets for the first and second models. Specifically, for the first model, a training set 208 may include the H2H conversations (each with a labeled clarification question), as well as a negative example for each H2H conversation—a randomly-selected clarification question from the clarification questions database, which is not the labeled clarification question in that H2H conversation. For the second model, a training set 210 may include the H2H conversations (each with a labeled clarification question), the text passages retrieved for each H2H conversation, and a negative example similar to that described above. In other words, the second training set 210 further includes, compared to the first training set 208, the text passages. Optionally, the training sets 208 and 210 include only H2H conversations whose labeled answers are positive (for example, contain a positive word such as "Yes" and no negative words), to ensure that training is not being performed based on conversations where an irrelevant clarification question was asked.

In a step 212, the first of the two models may be trained (also "fine-tuned") based on the first training set 208. The training makes the first model able to output (at inference time, further discussed with reference to FIG. 3, below), for each of multiple candidate clarification questions provided to it as input, a score denoting a strength of association between the respective candidate clarification question and a certain, ongoing, search conversation. This capability may be learned based on the H2H conversations, their labeled clarification questions, and negative examples, as discussed further below.

The first model may be a deep learning language model, such as BERT (Devlin et al., "BERT: Pre-training of Deep Bidirectional Transformers for Language Understanding," arXiv:1810.04805 [cs.CL], October 2018), or any other conventional language model. Although the following discussion utilizes certain BERT-related terminology for reasons of convenience, those of skill in the art will readily recognize how to adapt this discussion to any other conventional language model.

Training may be done through a triplet network (see Hoffer et al., "Deep Metric Learning Using Triplet Network," Workshop Track Proceedings of the 3$^{rd}$ International Conference on Learning Representations, (ICLR 2015), May 7-9, 2015) used for BERT fine-tuning (see Mass et al., "A Study of BERT for Non-Factoid Question-Answering under Passage Length Constraints," arXiv:1908.06780 [cs.IR], August 2019). It uses triplets ($C^{j-}$, $cq^+$, $cq^-$) as input, where $cq^+$ is the clarification question of conversation $C^j$ at utterance $c_j$, and $cq^-$ is the negative example.

The training of the first model results in a trained first model 112a (also depicted in FIG. 1).

In a step 214, the second of the two models may be trained based on the second training set 210. The second model may be a deep learning language model, similar to the first model.

The training makes the second model able to output (at inference time, further discussed with reference to FIG. 3, below), for each of multiple candidate clarification questions provided to it as input, a score denoting a strength of association between the respective candidate clarification question, a certain ongoing search conversation, and the text passage that was retrieved for the respective candidate clarification question. This capability may be learned based on the H2H conversations, their labeled clarification questions, their relevant text passages, and negative examples, as discussed further below.

A triplet for input into the second model may be ($C^{j-1}$ [SEP] p, $cq^+$, $cq^-$), where p is the text passage retrieved for $C^{j-1}$, [SEP] is BERT's seperator token, $cq^+$ is the labeled clarification question $c_j$. A negative example $cq^-$ is selected similar to the manner discussed above, with respect to the first model.

In case the language model, such as BERT, limits the maximum number of tokens to 512 (or to another relatively small and insufficient number), a conversation context $C^j$ may be represented using the first x utterances whose total length is less than the character limit. The passage extraction window size may be set, accordingly, to that character limit. Note that implementation of the present method using BERT may tokenize each character, so that BERT's token limit is essentially a character limit.

The training of the second model results in a trained second model 112b (also depicted in FIG. 1).

Reference is now made to FIG. 3, which illustrates a method 300 for selecting a suitable clarification question during a search conversation, in accordance with an embodiment. Steps of method 300 implement the instructions of clarification-question selection module 128 (of FIG. 1).

Method 300 may be executed, in real-time, during an ongoing search conversation (also "conversational search session") between the conversational search system and a user.

In a step 302, a search conversation that includes utterances by the user and by the conversational search system may be received. It is also possible for a conversation still in its early stages to include only an utterance (or multiple utterances) by the user, as the conversational search system has not yet asked any clarification questions.

In case clarification-question selection module 128 is included in conversational search system 120 (both of FIG. 1), then another component of system 120 may transmit an indication to module 128 that the ongoing search conversation has reached a stage that a clarification question is required, as well as transmit the contents of that search conversation to module 128. In case module 128 is disposed externally to system 120, such as in a separate server, then the indication and contents of the search conversation may be transmitted to module 128 over a computer network, for example.

In a step 304, text passages that are relevant to the search conversation may be retrieved from the solution documents database. This may be performed in two sub-steps, as follows:

First, top-m solution documents are retrieved; namely, a conventional search engine (using an "inverted index" or "index" for short) may be used to retrieve a list of solution documents ranked by their relevance to the query (namely, to $C^{j-1}$), and the m (an integer) top-ranking solution documents are finally obtained. m may be, for example, a value between 1-50, such as in a range between 1-10, 5-10, 1-20, 5-20, 1-30, 10-30, 1-40, 20-40, and so on and so forth. The querying of the search engine may be performed using a disjunctive query created from all words in $C^{j-1}$. As in step 204 above, $C^{j-1}$ may be treated as a verbose query, and the Fixed-Point (FP) method may be applied for weighting its words. Yet, compared to many typical verbose queries, dialogs (such as H2H conversations and search conversations) are further segmented into distinct utterances. Using this observation, an utterance-biased extension for enhanced word-weighting may be implemented. To this end, the various utterances in $C^{j-1}$ may be first scored based on the initial FP weights of words they contain. Then, utterance scores may be propagated back to their associated words.

Second, candidate text passages are extracted from those top-m solution documents using a partly-overlapping, fixed-size, sliding window—similarly to the passage extraction done during training. Next, each candidate text passage p may be assigned an initial score based on the coverage of words in $C^{j-1}$ by p. Coverage may be defined as the sum over all words in each utterance, using words' global IDF (Inverse Document Frequency) and their (scaled) TF (Term Frequency). The final text passage score may be calculated as a linear combination of its initial score and the score of the solution document it is extracted from, or any other type of combination of these two scores. Finally, top-r text passages may be selected as the output of step 304, namely—a predefined number (r, an integer) of text passages having the highest final scores. r may be, for example, a value between 1-50, such as in a range between 1-10, 5-10, 1-20, 5-20, 1-30, 10-30, 1-40, 20-40, and so on and so forth (and can be equal to or different from r of step 204, above).

In a step 306, for each of the top-r text passages selected in the previous step, candidate clarification questions that are relevant to both the respective text passage and the search conversation may be retrieved from the clarification questions database. Again, this may be performed similarly to the retrieval of candidate clarification questions discussed with reference to step 206 of method 200 (FIG. 2), but for the contents of the search conversation (here, $C^{j-1}$) instead of the historical H2H conversation (there, $C^k$), and for the text passages selected in step 304 instead of those selected in step 204.

In a step 308, the candidate clarification questions retrieved in step 306 may be ranked by one or both of the trained models 112a-b.

Ranking by the first trained model 112a may output, for each of these candidate clarification questions, a score denoting a strength of association between the respective candidate clarification question and the search conversation.

Ranking by the second trained model 112b may output, for each of these candidate clarification questions, a score denoting a strength of association between the respective candidate clarification question, the search conversation, and the text passage that was retrieved for the respective candidate clarification question.

In an optional step 310, which may be executed if ranking by both model is performed, the scores output by these two models may be fused, to provide combined score for each candidate clarification question. Fusion may be performed, for example, using the conventional Comb SUM method (see Shengli Wu, "Data Fusion in Information Retrieval," volume 13, 2012, Springer-Verlag, Berlin), or using any other mathematical combination, linear or non-linear, of the scores.

In a step 312, the top-ranking candidate clarification question may be selected for provision (namely, presentation) to the user. Optionally, two or more (for example, 2-10 or 2-5) top-ranking candidate clarification questions may be selected, and either presented to the user all at once or one by one; in the latter option, a negative answer by the user to one question triggers the presentation of a subsequent question, and so on and so forth according to a descending score of the questions.

The top-ranking candidate clarification question(s) may be provided by clarification questions selection module 128 (of FIG. 1) to the relevant component of conversational search system (also of FIG. 1) which is configured to present the question(s) to the user, or, in case module 128 is implemented externally to system 120, module 128 may provide these question(s) to system 120 over a computer network.

Experimental Results

Method 200 (FIG. 2) and method 300 (FIG. 3) were evaluated on two datasets. The first, "ClariQ," represents an information-seeking use-case. See M. Aliannejadi et al., "ConvAI3: Clarifying Questions for Open-Domain Dialogue Systems (ClariQ)," in the Search-oriented Conversational AI (SCAI) EMNLP 2020 workshop; as well as online at http://convai.io (last viewed Jul. 6, 2021). The second, "Support," contains conversations and technical documents of an internal customer support site of International Business Machines Corp. Statistics on the two datasets are given in Table 1.

TABLE 1

Dataset statistics

|  | ClariQ | Support |
|---|---|---|
| No. of solution documents | 2.7M | 520 |
| No. of conversations (train/dev/test) | 187/50/60 | 500/39/43 |
| No. of clarification questions | 3940 | 704 |
| Average/maximum turns per conversation | 3/3 | 8.2/80.5 |
| Average/maximum clarification questions per conversation | 14/18 | 1.27/5 |

There are several differences between the two datasets. First, the ClariQ dataset was built by crowd-sourcing for the task of clarification questions selection, and thus includes high-quality clarification questions. The Support dataset contains noisy logs of human-to-human conversations, that contain a lot of niceties and 'chit-chat' utterances such as "Thanks for your help" or "Are you still there?". A rule-based model was used to identify and label clarification questions in this dataset.

Second, in ClariQ, all utterances are clarification questions and their answers. There is no real conversation context as in the Support dataset. In other words, each topic (i.e., a user's initial query) in ClariQ has an independent set of clarification questions and their answers.

The experimental setup was as follows:

Documents in the solution documents index (database) were represented using two fields. The first field contains the actual document content. The second field augments the document's representation with the text of all conversations that link to it in the training set. The second field was used only in the customer support dataset (Support), since it has too few documents (only 520) and there is a large overlap between documents in the training and development conversations. In the open domain dataset (ClariQ) that field was not used, since the corpus contains a large number of documents (2.7M) and using this field would have favored a small subset of documents of the training conversations only.

For text passage retrieval, a sliding window of 512 characters was used on retrieved documents' content.

Common values were used for the hyper parameters, with $\lambda=0.5$, to combine document and passage scores, and $\mu=2000$ for the Dirichlet smoothing of the documents language model used in the Fixed-Point ranking.

The full conversations were used to retrieve passages. For feeding to the BERT models, the first x full utterances whose total length was less than 512 characters were concatenated.

The PyTorch Hugging Face implementation of BERT was used. For the two BERT models, bert-base-uncased (12-layers, 768-hidden, 12-heads, 110M parameters) was used. Fine-tuning was done with the following default hyper parameters: max_seq_len of 256 tokens for the BERT-C-cq model, and 384 for the BERT-C-P-cq model, learning rate of 2e-5 and 3 training epochs.

1000 initial candidate clarifications were retrieved, at the most, for each passage. All experiments were run on 32 GB V100 GPUs. The ranking times of 1000 clarification questions for each conversation took about 1-2 seconds.

Table 2 reports the results of the development sets of the two datasets, using the customary metric of recall (R) at 5, 10, 20, and 30. On both datasets, each of the BERT rankers showed a significant improvement over an initial, naïve retrieval from the clarification questions database (denoted by IR-Base). For example, on Support, BERT-C-cq achieved R@30=0.538 compared to R@30=0.294 of IR-Base (an improvement of 82%).

TABLE 2

Experimental results

| ClariQ | R@5 | R@10 | R@20 | R@30 |
|---|---|---|---|---|
| IR-Base | .327 | .575 | .669 | .706 |
| BERT-C-cq | .352 | .631 | .743 | .770 |
| BERT-C-P-cq | .344 | .615 | .750 | .774 |
| BERT-fusion | .353 | .639 | .758 | .791 |
| Support |  |  |  |  |
| IR-Base | .102 | .153 | .269 | .294 |
| BERT-C-cq | .358 | .410 | .487 | .538 |
| BERT-C-P-cq | .217 | .294 | .487 | .538 |
| BERT-fusion | .294 | .410 | .500 | .551 |

One can further observe that the two BERT models (BERT-C-cq and BERT-C-P-cq) yield quite similar results on both datasets. However, when fusing their scores (BERT-fusion), there is another improvement of about 2.5% over each of the rankers separately. For example, on ClariQ, BERT-fusion achieved R@30=0.791, compared to R@30=0.77 of BERT-C-cq.

TABLE 3

Performance compared to top Clariq performers

|  | R@5 | R@10 | R@20 | R@30 |
|---|---|---|---|---|
| NTES_ALONG | .34 | .632 | .8335 | .874 |
| BERT-fusion | .338 | .631 | .807 | .857 |
| TAL-ML | .339 | .625 | .817 | .856 |
| Karl | .335 | .623 | .799 | .849 |
| Soda | .327 | .606 | .801 | .843 |

Table 3 shows the official Clariq results on the test set. It can be seen that BERT-fusion was the second best.

All the techniques, parameters, and other characteristics described above with respect to the experimental results are optional embodiments of the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, a field-programmable gate array (FPGA), or a programmable logic array (PLA) may execute the computer readable program instructions by utilizing state information of the computer readable program instructions to personalize the electronic circuitry, in order to perform aspects of the present invention. In some embodiments, electronic circuitry including, for example, an application-specific integrated circuit (ASIC), may be incorporate the computer readable program instructions already at time of fabrication, such that the ASIC is configured to execute these instructions without programming.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the description and claims, each of the terms "substantially," "essentially," and forms thereof, when describing a numerical value, means up to a 20% deviation (namely, ±20%) from that value. Similarly, when such a term describes a numerical range, it means up to a 20% broader range—10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A computer-implemented method comprising the following automated steps:
    receiving a search conversation that comprises utterances by a user and by a conversational search system;
    providing a solution documents database that comprises multiple solution documents, wherein:
        each of the solution documents comprises multiple text passages,
        each of the solution documents is available via a hyperlink,
        the hyperlink to each respective solution document is included in at least one historical human-to-human conversation, and
        in the at least one historical human-to-human conversation, the hyperlink to the respective solution document was provided by one human to another due to a decision by the one human that the respective solution document includes a solution to a problem raised by the other human;
    retrieving, from the solution documents database, text passages that are relevant to the search conversation;
    retrieving, from a clarification questions database, for each of the text passages, candidate clarification questions that are relevant to both the respective text passage and the search conversation;
    ranking the candidate clarification questions according to at least one of:
        a first deep learning model that outputs, for each of the candidate clarification questions, a score denoting a strength of association between the respective candidate clarification question and the search conversation, or
        a second deep learning model that outputs, for each of the candidate clarification questions, a score denoting a strength of association between the respective candidate clarification question, the search conversation, and the text passage that was retrieved for the respective candidate clarification question; and
    based on said ranking, providing a highest-ranking candidate clarification question for presentation to the user.

2. The computer-implemented method of claim 1, wherein:
    said ranking is according to a fusion of the scores output by the first and second deep learning models.

3. The computer-implemented method of claim 1, wherein said retrieving of the text passages comprises:
    retrieving, from the solution documents database, solution documents that are relevant to the search conversation, by querying the solution documents database with a query created from words in the search conversation, wherein said querying comprises utterance-biased weighting of the words;
    extracting candidate text passages from the retrieved solution documents using a fixed-size, partly-overlapping, sliding window;
    assigning an initial score to each of the candidate text passages, based on coverage of words in the search conversation by the respective candidate text passage; and
    calculating a final score for each of the candidate text passages, based on a combination of the respective initial score with a relevancy score that was assigned, in said retrieving from the solution documents database, to the solution document from which the respective candidate text passage was extracted;
    wherein said retrieving of the text passages is of a predefined number of those of the candidate text passages having a highest final score.

4. The computer-implemented method of claim 1, wherein said retrieving of the candidate clarification questions comprises:
    for each of the text passages, querying the clarification questions database with a concatenation of the respective text passage and the search conversation, to retrieve candidate clarification questions for that respective text passage.

5. The computer-implemented method of claim 1, further comprising, prior to said automated steps:
    providing a training set that comprises:
        conversations that each took place between a human user and a human agent, wherein a last utterance in each of the conversations is a labeled clarification question asked by the human agent, and
        for each of the conversations, a negative example which is a randomly-selected clarification question from the clarification questions database, wherein the randomly-selected clarification question is not the labeled clarification question of the respective conversation; and
    training the first deep learning model based on the training set.

6. The computer-implemented method of claim 1, further comprising, prior to said automated steps:
    providing a training set that comprises:
        conversations that each took place between a human user and a human agent, wherein each of the conversations comprises: a labeled clarification question asked by the human agent, and a labeled answer given by the human user,
        training text passages that are retrieved, from solution documents associated with the conversations, based on their relevancy to the conversations, and for each of the conversations, a negative example which is a randomly-selected clarification question from the clarification questions database, wherein the randomly-selected clarification question is not the labeled clarification question of the respective conversation; and training the second deep learning model based on the training set.

7. The computerized method according claim 1, wherein said automated steps are performed by at least one hardware processor.

8. A system comprising:
(a) at least one hardware processor; and
(b) a non-transitory computer-readable storage medium having program code embodied therewith, the program code executable by said at least one hardware processor to, automatically:
receive a search conversation that comprises utterances by a user and by a conversational search system,
provide a solution documents database that comprises multiple solution documents, wherein:
each of the solution documents comprises multiple text passages,
each of the solution documents is available via a hyperlink,
the hyperlink to each respective solution document is included in at least one historical human-to-human conversation, and
in the at least one historical human-to-human conversation, the hyperlink to the respective solution document was provided by one human to another due to a decision by the one human that the respective solution document includes a solution to a problem raised by the other human,
retrieve, from the solution documents database, text passages that are relevant to the search conversation,
retrieve, from a clarification questions database, for each of the text passages, candidate clarification questions that are relevant to both the respective text passage and the search conversation,
rank the candidate clarification questions according to at least one of:
a first deep learning model that outputs, for each of the candidate clarification questions, a score denoting a strength of association between the respective candidate clarification question and the search conversation, or
a second deep learning model that outputs, for each of the candidate clarification questions, a score denoting a strength of association between the respective candidate clarification question, the search conversation, and the text passage that was retrieved for the respective candidate clarification question, and
based on said ranking, provide a highest-ranking candidate clarification question for presentation to the user.

9. The system of claim 8, wherein:
said ranking is according to a fusion of the scores output by the first and second deep learning models.

10. The system of claim 8, wherein said retrieving of the text passages comprises:
retrieving, from the solution documents database, solution documents that are relevant to the search conversation, by querying the solution documents database with a query created from words in the search conversation, wherein said querying comprises utterance-biased weighting of the words;
extracting candidate text passages from the retrieved solution documents using a fixed-size, partly-overlapping, sliding window;
assigning an initial score to each of the candidate text passages, based on coverage of words in the search conversation by the respective candidate text passage; and
calculating a final score for each of the candidate text passages, based on a combination of the respective initial score with a relevancy score that was assigned, in said retrieving from the solution documents database, to the solution document from which the respective candidate text passage was extracted;
wherein said retrieving of the text passages is of a predefined number of those of the candidate text passages having a highest final score.

11. The system of claim 8, wherein said retrieving of the candidate clarification questions comprises:
for each of the text passages, querying the clarification questions database with a concatenation of the respective text passage and the search conversation, to retrieve candidate clarification questions for that respective text passage.

12. The system of claim 8, wherein the program code is further executable by said at least one hardware processor to, prior to the steps in (b):
provide a training set that comprises:
conversations that each took place between a human user and a human agent, wherein a last utterance in each of the conversations is a labeled clarification question asked by the human agent, and
for each of the conversations, a negative example which is a randomly-selected clarification question from the clarification questions database, wherein the randomly-selected clarification question is not the labeled clarification question of the respective conversation; and
train the first deep learning model based on the training set.

13. The system of claim 8, wherein the program code is further executable by said at least one hardware processor to, prior to the steps in (b):
provide a training set that comprises:
conversations that each took place between a human user and a human agent, wherein each of the conversations comprises: a labeled clarification question asked by the human agent, and a labeled answer given by the human user,
training text passages that are retrieved, from solution documents associated with the conversations, based on their relevancy to the conversations, and
for each of the conversations, a negative example which is a randomly-selected clarification question from the clarification questions database, wherein the randomly-selected clarification question is not the labeled clarification question of the respective conversation; and
train the second deep learning model based on the training set.

14. A computer program product comprising a non-transitory computer-readable storage medium having program code embodied therewith, the program code executable by at least one hardware processor to:

receive a search conversation that comprises utterances by a user and by a conversational search system;
provide a solution documents database that comprises multiple solution documents, wherein:
 each of the solution documents comprises multiple text passages,
 each of the solution documents is available via a hyperlink,
 the hyperlink to each respective solution document is included in at least one historical human-to-human conversation, and
 in the at least one historical human-to-human conversation, the hyperlink to the respective solution document was provided by one human to another due to a decision by the one human that the respective solution document includes a solution to a problem raised by the other human;
retrieve, from the solution documents database, text passages that are relevant to the search conversation;
retrieve, from a clarification questions database, for each of the text passages, candidate clarification questions that are relevant to both the respective text passage and the search conversation;
rank the candidate clarification questions according to at least one of:
 a first deep learning model that outputs, for each of the candidate clarification questions, a score denoting a strength of association between the respective candidate clarification question and the search conversation, or
 a second deep learning model that outputs, for each of the candidate clarification questions, a score denoting a strength of association between the respective candidate clarification question, the search conversation, and the text passage that was retrieved for the respective candidate clarification question; and
based on said ranking, provide a highest-ranking candidate clarification question for presentation to the user.

15. The computer program product of claim 14, wherein:
said ranking is according to a fusion of the scores output by the first and second deep learning models.

16. The computer program product of claim 14, wherein said retrieving of the text passages comprises:
retrieving, from the solution documents database, solution documents that are relevant to the search conversation, by querying the solution documents database with a query created from words in the search conversation, wherein said querying comprises utterance-biased weighting of the words;
extracting candidate text passages from the retrieved solution documents using a fixed-size, partly-overlapping, sliding window;
assigning an initial score to each of the candidate text passages, based on coverage of words in the search conversation by the respective candidate text passage; and
calculating a final score for each of the candidate text passages, based on a combination of the respective initial score with a relevancy score that was assigned, in said retrieving from the solution documents database, to the solution document from which the respective candidate text passage was extracted;
wherein said retrieving of the text passages is of a predefined number of those of the candidate text passages having a highest final score.

17. The computer program product of claim 14, wherein said retrieving of the candidate clarification questions comprises:
for each of the text passages, querying the clarification questions database with a concatenation of the respective text passage and the search conversation, to retrieve candidate clarification questions for that respective text passage.

18. The computer program product of claim 14, wherein the program code is further executable by said at least one hardware processor to, prior to the steps of claim 14:
provide a training set that comprises:
 conversations that each took place between a human user and a human agent, wherein a last utterance in each of the conversations is a labeled clarification question asked by the human agent, and
 for each of the conversations, a negative example which is a randomly-selected clarification question from the clarification questions database, wherein the randomly-selected clarification question is not the labeled clarification question of the respective conversation; and
train the first deep learning model based on the training set.

19. The computer program product of claim 14, wherein the program code is further executable by said at least one hardware processor to, prior to the steps of claim 14:
provide a training set that comprises:
 conversations that each took place between a human user and a human agent, wherein each of the conversations comprises: a labeled clarification question asked by the human agent, and a labeled answer given by the human user,
 training text passages that are retrieved, from solution documents associated with the conversations, based on their relevancy to the conversations, and
 for each of the conversations, a negative example which is a randomly-selected clarification question from the clarification questions database, wherein the randomly-selected clarification question is not the labeled clarification question of the respective conversation; and
train the second deep learning model based on the training set.

* * * * *